United States Patent Office 3,618,391
Patented Nov. 9, 1971

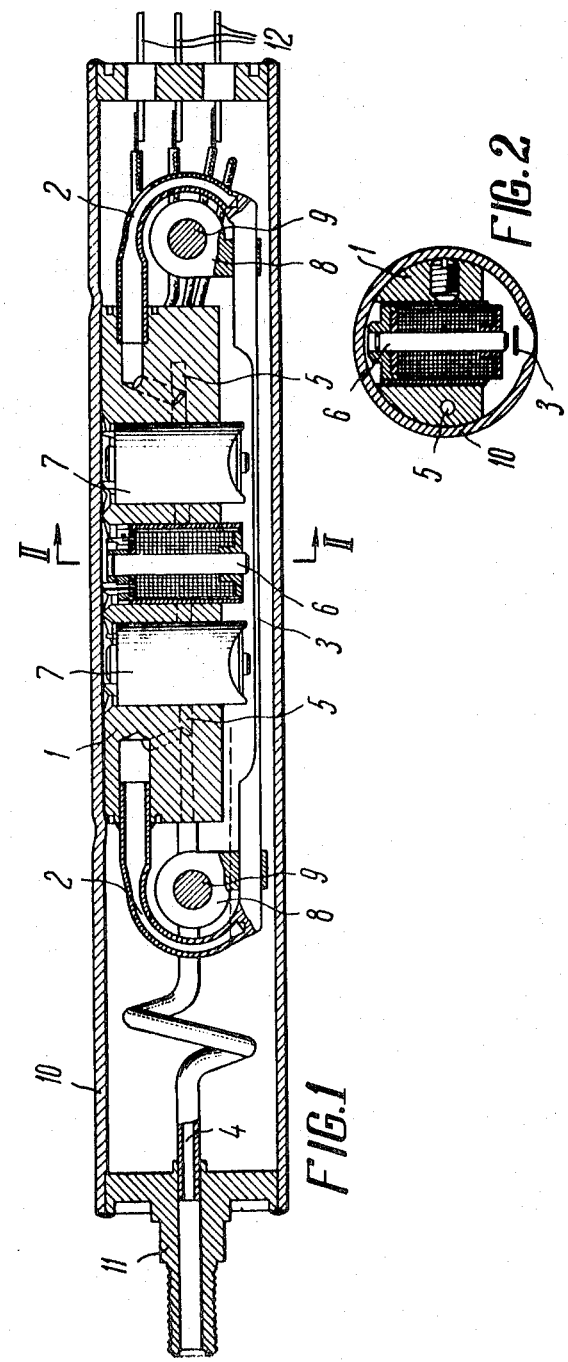

3,618,391
PRESSURE TRANSDUCER
Ilia Yakovlevich Rivkin, Ulitsa Marshala Tukhachevskogo 38, korpus 2, kv. 47, and Evgeny Vasilievich Ovcharov, Novye Cheremushki, kvartal 206, korpus 102, kv. 21, both of Moscow, U.S.S.R.
Filed Nov. 14, 1969, Ser. No. 876,828
Int. Cl. G01l 9/10
U.S. Cl. 73—398 R
5 Claims

ABSTRACT OF THE DISCLOSURE

A pressure transducer comprising a pair of identical pressure tubes having stationary ends mounted on a common base member and into which fluid under pressure which is to be measured can be supplied. The movable ends of these pressure tubes are connected by a resilient connecting member, whereby the tension of this resilient connecting member is varied by the deformation of these pressure tubes under the action of the pressure of the fluid supplied into them. The transducer also comprises means for generating mechanical oscillations of the resilient connecting member and for converting such oscillations into an electromotive force.

---

The present invention relates to pressure transducers and, more particularly, to systems for measuring pressures inside oil and gas wells.

There are known pressure transducers for measuring pressures inside oil and gas wells.

A known presure transducer of this kind comprises a pressure-responsive member—a thick-walled diaphragm, a resilient connecting member in the form of a string, circular in cross-section, carying a weight on the central portion thereof and tensioned between this pressure-responsive member and a massive base member of the transducer, and an electromagnet including a magnetized core and an inductance coil wound about this core. The electromagnet is mounted on the base member of the transducer, in opposition to the central portion of the string. Under the action fo the presure being measured the diaphgram is deformed, whereby the tension of the string is varied, and the natural frequency of oscillation of this string varies accordingly. A short pulse of electric current, sent to the electromagnet, excites the string for a series of oscillations. After the action of this current pulse has ceased, an electromotive force is induced in the same electromagnet, of which the frequency is equal to natural frequency of the oscillation of the string.

The frequency of this electromotive force is proportional to the pressure being measured, and this frequency can be measured by either analog or digital frequency meters.

However, this known pressure transducer features a relatively great basic measurmeent error (about 1% of the measurement range), which is brought about by inadequately good metrological properties of the thick-walled diaphgram; it also features a comparatively great additional temperature error, on account of its being practically impossible to make the string and the base member, to which this string is secured, from materials having the same temperature expansion factor. Also the size of the known pressure transducer is comparatively great (its minimal diameter being about 42 mm.), because it is very difficult to make a small-size diaphgram which has sufficiently accurate response to great static pressures; the size of the transducer is further increased by the string extending axially of the insrtument (whereas the electromagnet should be spaced from this axis).

The present invention has for its aim the creation of a pressure transducer which should combine compact size, that would widen the field of its applications and reduce its thermal inertia, with sufficiently good metrological characteristics, and which should also feature high reliability of performance.

This aim is attained with a pressure transducer comprising a resilient connecting member, such as a resilient string and the like, connected with a pressure-responsive member adapted to be deformed by the influence of the pressure being measured, and thus to vary the tension of this resilient connecting member, this transducer further including means for generating mechanical oscillations of this resilient connecting member and for converting these oscillations into an electromotive force, in which pressure transducer, in accordance with the present invention, said pressure-responsive member includes a pair of substantially identical pressure tubes having the movable ends thereof connected by said resilient connecting member, the respective stationary ends of said pair of pressure tubes being mounted on a common base member in such a way that, when pressure being measured is supplied into said pressure tubes, said movable ends thereof tend to move to increase the tension of said resilient connecting member.

According to a preferred embodiment of the present invention, said pair of pressure tubes and said resilient connecting member of the pressure transducer are made as an integral member from a material featuring a relatively small temperature coefficient of the elasticity module thereof.

It is also advisable for the base member of said pressure transducer to be provided with openings for mounting therein said means for generating mechanical oscillations of said resilient connecting member and for converting such oscillations, said means including electromagnets.

It is further advisable for said respective movable ends of said pair of pressure tubes to carry adjustable weights.

The present invention will be better understood from the following detailed description of a prefered embodiment thereof, with due reference being had to the accompanying drawings, wherein:

FIG. 1 shows schematically an axially-sectional view of a pressure transducer, embodying the invention; and FIG. 2 is a cross-sectional view taken along line II—II of FIG. 1.

Referring now in particular to the appended drawings, a pressure transducer, embodying the invention, comprises a base member 1 and a pair of resilient pressure tubes 2 having their respective stationary ends rigidly secured to the base member 1. The movable ends of the pressure tubes 2 are connected to each other by a resilient connecting plate 3.

The internal spaces of both pressure tubes 2 are connected to capillary tubes through respective passages provided in the base member 1, a fluid under pressure to be measured being supplied into the pressure tubes 2 through capillary tube 4. The base member 1 also supports an electromagnet 6 adapted to generate mechanical oscillations in the resilient connecting plate 3, and electromagnets 7 adapted to convert these oscillations into an electromotive force.

The respective windings of the electromagnets 7 are connected in series. The herein disclosed transducer may be associated with an amplifier (not shown in the appended drawings) connected electrically to the output terminals of the electromagnets 7 and to the input of the electromagnet 6; in which case the transducer operates with undamped oscillations of which the frequency is proportional to the pressure being measured.

According to another embodiment of the present invention, the pressure transducer may have a single electromagnet 6 which, in this embodiment, acts both as a generator of oscillations of the resilient connecting plate 3 and as a converter of damped oscillations of this connecting plate into an alternating-current electromotive force.

In the herein disclosed transducer the cores of each one of the electromagnets 6 and 7 are permanently magnetized.

It is advisable for the movable end portions of the pressure tubes 2 to carry adjustable weights 8. The actual mass of each weight 8 can be adjusted by varying the amount of lead 9 filling the respective cavities in the weights 8.

The pressure tubes 2 and the resilient connecting plate 3 are preferably manufactured as an integral member from a single bar, the bar being of an alloy featuring a small temperature coefficient of the elasticity module. The same material should be used for manufacturing the base member 1.

The transducer is enclosed within an air-tight evacuated body 10. A fluid under pressure to be measured is introduced through a connection 11, and the electric leads of the electromagnets 6 and 7 are connected to sealed terminals 12.

The herein disclosed pressure transducer operates, as follows.

Fluid under pressure to be measured is supplied through the capillary tube 4 and the passages 5 into the pressure tubes 2. The latter tend to uncoil under the action of the pressure thereinside, and thus apply additional expanding tension to the connecting plate 3. As a result, the natural frequency of oscillation of this connecting plate is varied. The connecting plate is continuously oscillated by the action of the electromagnet 6 connected to the output of the associated amplifier (not shown), whereas the electromagnets 7 are connected to the input of the same amplifier. The frequency of oscillation of the resilient connecting plate 3 is proportional to the pressure being measured.

As has been already mentioned, a transducer, embodying the present invention, may operate with damped oscillations and may comprise a single electromagnet 6. In the last-mentioned case the electromagnet 6 is periodically supplied with a short-duration pulses of electric current, each pulse starting a series of oscillations of the connecting plate 3. When this excitation pulse is terminated, there is induced in the electromagnet 6 an A.C. electromotive force of which the frequency is equal to the natural frequency of oscillations of the resilient connecting plate.

The electromotive force originated in the herein disclosed transducer is supplied to a receiving instrument, where the frequency thereof is measured either by an analog frequency meter, or by a digital one.

When a pressure transducer, embodying the present invention, operates with undamped oscillations, it is possible to make the frequency measurements by means of readily available frequency meters of a commonly used kind; however, the presence of an amplifier, which in this case is an essential constituent part of the pressure transducer, may affect the reliability of the performance of the transducer and prevents its use under elevated temperatures.

When a pressure transducer, embodying the invention, operates with damped oscillations, the last-mentioned short-comings are eliminated; however, in this case secondary instruments of a special design are needed to effect the necessary measurements of the frequency of oscillations.

The provision of the adjustable weights 8 in the herein disclosed pressure transducer makes it possible to control, although within a limited range, the natural frequency of initial oscillation of the resilient connecting plate 3 and also to reduce significantly (about 1.5) the damping decrement of the plate 3.

The force measuring principle employed in the herein disclosed transducer is based on a fact that the longitudinal rigidity of the resilient connecting plate 3 is several dozen times greater than the bending rigidity of the pressure tubes 2, whereby the basic errors associated with the pressure tubes 2 as pressure-responsive members influence but slightly the accuracy of performance of the pressure transducer, as a whole. The same reason is responsible for a considerable reduction of the additional temperature error. This reduction is further promoted by the base member 1, the pressure tubes 2 and the resilient connecting plate 3 being all made from the same material, i.e. they all feature practically the same temperature expansion coefficient. This material is preferably an alloy featuring a small temperature coefficient of the elasticity module.

The main measurement error of the herein disclosed pressure transducer does not exceed about 0.16%, while the additional temperature variation error amounts to about 0.02% to 0.03% per 10° C. Practical tests have shown that the frequency characteristics of a pressure transducer, embodying the invention, may be guaranteed to vary no more than by 0.4 percent after six months of continuous operation.

Pressure transducers, embodying the present invention, can have a compact size (as mall as 16 mm.); the amplitude of alternating current signals they send does not vary noticeably over long periods of operation.

The enclosure of the operating parts of a pressure transducer, embodying the invention, within a gas-tight evacuated body positively prevents the influence of the ambient temperature upon the measurements, when the transducer is installed within a sealed chamber, where the internal pressure is built up with the growth of the temperature, on account of the expansion of the air trapped within the chamber.

A pressure transducer, embodying the present invention, may also be used for temperature measurements (according to manometric measurement methods), as well as for measuring mechanical forces and displacements, by the employment of hydraulic methods.

What we claim is:

1. A pressure transducer comprising: a base member; a pair of substantially identical pressure tubes adapted to be supplied with fluid under pressure which is to be measured, said pair of pressure tubes including relatively stationary end portions mounted on said base member and further including relatively movable end portions; a resilient connecting member operatively connecting the respective movable end portions; said pair of pressure tubes being arranged on said base member such that, when a pressure medium is fed thereinto, said pressure tubes undergo deformation and displace said movable end portions to place said resilient connecting member under a tension the magnitude of which depends on the pressure of said pressure medium; and means for generating oscillations in said resilient connecting member and for converting such oscillations into an electromotive force.

2. A pressure transducer, according to claim 1, wherein said pair of pressure tubes and said resilient connecting member cooperatively constitute an integral member of a material having a relatively small coefficient of the elasticity module thereof.

3. A pressure transducer, according to claim 1, wherein said base member is provided with openings in which are mounted said means for generating oscillations in said resilient connecting member and for converting such oscillations into an electromotive force, said means comprising electromagnets.

4. A pressure transducer, as set forth in claim 1, comprising weight means and wherein said movable end portions carry said weight means.

5. A pressure transducer as claimed in claim 1 further comprising means for supplying said pressure medium to said tubes and means to encase said base member, pressure tube and connecting member in an airtight chamber.

References Cited

UNITED STATES PATENTS 2,455,021   11/1948   Rieber _____ 73—398 X

DONALD O. WOODIEL, Primary Examiner

U.S. Cl. X.R.

73—412